Jan. 9, 1940.   D. F. OTHMER   2,186,617

PROCESS OF SEPARATING CHEMICAL COMPOUNDS

Filed Dec. 12, 1935

Donald F. Othmer,
INVENTOR:

BY N. M. Perrins
Daniel J. Mayne
ATTORNEYS.

Patented Jan. 9, 1940

2,186,617

UNITED STATES PATENT OFFICE 2,186,617

PROCESS OF SEPARATING CHEMICAL COMPOUNDS

Donald F. Othmer, Brooklyn, N. Y., assignor, by mesne assignments, to Eastman Kodak Company, Rochester, N. Y., a corporation of New Jersey Application December 12, 1935, Serial No. 54,120

2 Claims. (Cl. 202—61)

This invention relates to a process for separating chemical compounds in admixture with other materials and more particularly to a process for separating aqueous aliphatic acids from other components in admixture therewith.

There are various commercial chemical materials which, either as produced or obtained as by-products, are in the form of a mixture or some other type of association and necessitate at least some separation before the desired chemical may be used commercially. For example, one of the most common sources of acetic acid is from the destructive distillation of wood. The acid is obtained as a mixture termed "pyroligneous liquor" which comprises tar, alcohol, water and acetic acid. The term "tar" is used broadly to embrace various oils, phenols, aldehydes, resins, and the like, present, and the term "alcohol" is employed to embrace not only methyl alcohol, but other components, such as acetone, allyl alcohol and the like. The aqueous acetic acid should be separated from some or all of these various other components before it can be efficiently concentrated or utilized.

Another source of acidic chemical mixtures is from the manufacture of cellulose acetate or other cellulosic materials. After these processes are completed there are generally produced as a by-product a great amount of aqueous acid which contains solids, solvents and various other components from which the aqueous acid should be separated before subjecting it to reuse or concentration treatments.

When acids and other materials are produced by the action of micro-organisms they are sometimes obtained in the aqueous state in admixture with solids, oils and salts, from which the aqueous acid should be separated before further treatment.

A number of processes have been devised for separating the acid component from other materials in admixture therewith. For example, U. S. Patent 1,546,902 describes a method employing a heated roller or casting wheel. U. S. Patent 1,839,932 describes a process for separating anhydrous acetic acid from a higher boiling component.

I have developed a new process for separating aqueous aliphatic acids, and in particular aqueous acetic acid, when in admixture with other components.

This invention has as an object to provide a process for separating certain chemical materials in admixture from one another. A further object is to provide a process for separating aqueous aliphatic acids from mixtures, solutions or other associations containing this component. A still further object is to provide a process for preventing and separating tar and gum formations in aliphatic acids solutions from pyroligneous liquor. Another object is to provide a process in which acetic acid and water may be removed from tar, oils and other high boiling point components. Still another object is to provide a process for the removal of acetic acid and water from the admixture obtained in the manufacture of cellulose products. It is also an object to provide a process which will be simple, inexpensive and in which the amount of heat required is kept to a low value. Other objects will appear hereinafter.

These objects are accomplished by the following invention which comprises primarily a heating and distillation process. I have found that very satisfactory separation of the above-described admixtures may be obtained by incorporationg therewith various agents which assist in the ready separation of the chemical materials desired to be recovered. It is important to note that these steps are to be distinguished from the ordinary azeotropic processes employed in dehydrating aliphatic acids. My process may be carried out in an apparatus of a known type, although it is to be noted that I have provided an apparatus for carrying out my processes which apparatus is described in detail hereinafter.

Further details concerning my new process may be observed from a consideration of the following description of my invention as applied to the treatment of pyroligneous liquor. This example is given for the purposes of illustration only.

As already indicated above, pyroligneous liquor comprises a large number of components which are enumerated in some detail in U. S. Patent 1,975,091. However, for present purposes, it would appear sufficient to briefly describe pyroligneous liquor as comprising tar, alcohol, water and acetic acid. It being understood that the term "tar" includes besides tar the various resinous and oily materials associated therewith and that the term "alcohol", while embracing primarily methanol, may also embrace acetone and associated materials. The tarry component may be in the form of suspended matter, dissolved matter of components which yield tar during the normal processing of the pyroligneous liquor.

It has been known for some time that even if pyroligneous liquor was carefully settled to remove suspended tarry products, when the treated liquor was subsequently heated or distilled tar formation occurred thereby injuring apparatus by caking or plugging.

Among the many chemical materials present in pyroligneous acid are phenols, cresols and aldehydes. Tar formation at various points in handling pyroligneous liquor in accordance with the usual procedure and the usual distillation treatment is probably due to polymerization of these aforementioned components. For example, Bakelite, a well-known phenol-aldehyde polymerization product, is quite similar in formation and, according to literature, may be formed in various media, either acid or alkaline, by heating or cooling a simple standing. Likewise, when pyroligneous liquors are subjected to treatment in accordance with the usual distillation procedure, which includes heating and cooling, tar is formed at various points in the apparatus, thereby causing considerable trouble.

I have found that this tar forming tendency may be stopped once and for all by a continuous treatment of the pyroligneous liquors at a temperature equivalent to a steam pressure of about 100 to about 150 pounds for one or two hours. By my continuous treatment, which is in some respects similar to the treatment described in U. S. Patents 1,089,417 and 1,339,022, resinification is caused to take place thereby eliminating all available tar forming materials as a hard, tough product not dissimilar to Bakelite. It is to be understood that my continuous resinification step has a number of advantages. It may be applied to pyroligneous liquor independently of the various additional steps to be described and, on the other hand, the various additional steps may be applied to pyroligneous liquor to which my continuous heat treatment step has not been applied.

The pyroligneous liquor, either in the crude state or from the heat treatment just described, may be dealcoholized and then treated to recover the aqueous acetic acid. The dealcoholizing treatment, if it is to be applied, may be in accordance with the procedure set forth by me in Industrial and Engineering Chemistry of March, 1935, page 252, or it may be in accordance with the novel procedure to be described in detail hereinafter. In any event the pyroligneous liquor, even though subjected to my heat treatment to eliminate tar forming tendencies, will comprise a mixture of various crude oily and tarry high boiling constituents along with the acid and water and from which the acetic acid and water (aqueous acid) should be separated before further use of the treatment.

Some of these impurities boil at around 125–160° C. Hence, there is not much difference in boiling point between these materials and the water, boiling point of 100° C., and acetic acid, boiling point of about 118° C. Hence, while it is possible to separate to some extent the water and acetic acid from these tarry components by ordinary evaporation or distillation, a greatly improved separation may be obtained by proceeding in accordance with my novel procedure, which comprises incorporating with the water, acetic acid and tarry impurities, an agent which is capable of forming a constant boiling mixture with both the water and acetic acid, or of forming a ternary constant boiling mixture of all three. The formation of constant boiling mixtures with the acetic acid and water amounts to, in effect, the lowering of the boiling point of the aqueous acid to from 100–118° C. down to materially below 100° C. and generally in the neighborhood between 60° C. to about 90° C. dependent on the particular agent added. That is, after the agent is incorporated with the mixture and the mixture subjected to distillation, the aqueous acid may be readily removed from any higher boiling point components of the mixture.

The aqueous acetic acid (acetic acid and water) may then be recovered and dehydrated in accordance with any standard process or preferably in accordance with the procedure set forth in my application Serial No. 734,991 now Patent No. 2,050,234 or my application Serial No. 513,989 now Patent No. 2,028,800.

While I have described the above steps with respect to the separation of aqueous acetic acid from high boiling tarry components, my invention has wider applications. For example, similar procedure may be applied in recovering acetic acid and water from mixtures obtained in the esterification of cellulose. As pointed out by Lipscomb in his book entitled "Cellulose Acetate Its Manufacture and Application" there are a number of processes including the use of various non-solvents of cellulose acetate for its precipitation. Some of these solvents may be high boiling halogen compounds, ethers and the like. In the ordinary methods of producing cellulose acetate, it is sometimes necessary to add considerable sodium acetate or carbonate to neutralize inorganic acids present in the cellulose acetate precipitant and this yields aqueous acetic acid solutions which contain various suspended and dissolved salts.

By adding a suitable hydrocarbon to the aqueous acetic acid, salt or non-solvent mixture, the acetic acid and water may be removed simultaneously by distillation from such material which would collect in the still pot at the base of a suitable rectifying column. The vapors, of course, would be condensed and the condensate decanted in any usual manner to permit the recovery of the aqueous acetic acid therefrom.

Figure 1:
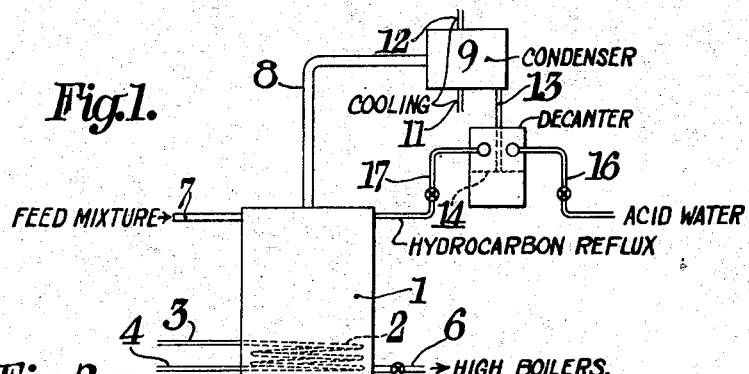
Fig. 1 is a diagrammatic side elevation of one form of apparatus in which my process for separating chemicals from higher boiling impurities may be carried out. Certain of the parts are shown in an exaggerated scale or in broken line for clarity.
Figure 2:
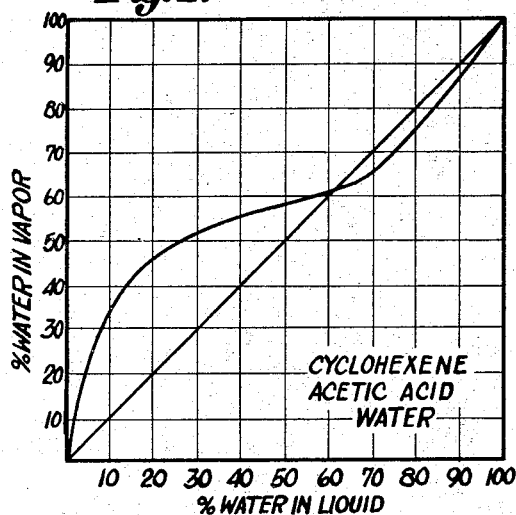
Figs. 2, 3, 4 and 5 represent plots of modified vapor composition curves wherein the percent water in the water layer after simple distillation with the agent stated, condensation and decantation is plotted against the ratio of water to acetic acid in the still pot.
Figure 3:
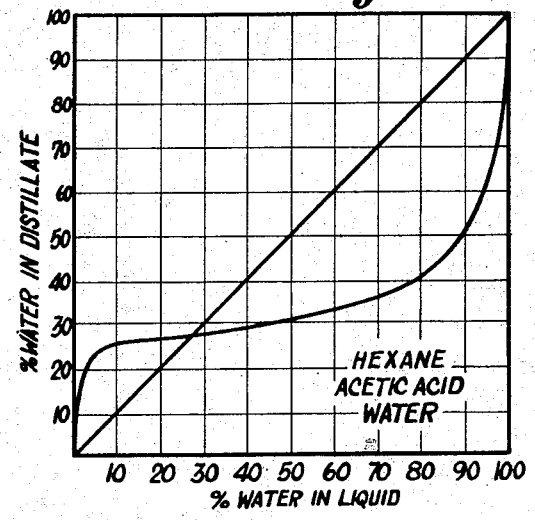
Figure 4:
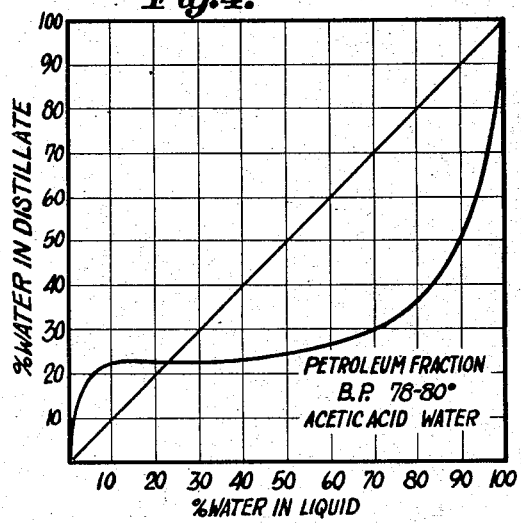
Figure 5:
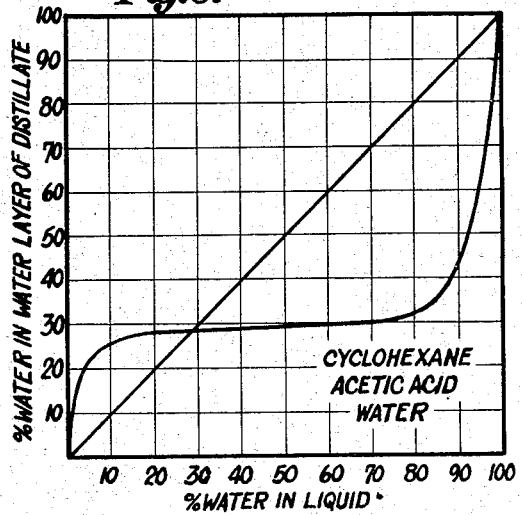

In Fig. 1 the numeral 1 represents a distillation column. Various size columns may be employed dependent on the characteristics of the particular mixture to be treated. The longer the column, the more efficient will be the rectification obtainable.

At the bottom of the column there is provided heating means 2 which may be supplied by steam or other heating medium by means of conduits 3 and 4. The bottom of the column is provided with a suitable valve draw-off pipe 6 through which the residual materials may be removed.

At a point some little distance up the column is provided an inlet pipe 7 for the introduction into the column of the tar acid and water or other mixture to be separated. If desired, the agent to be employed to assist in separation may also be introduced through conduit 7.

At the head of the column is provided a vapor outlet pipe 8 which is connected to the condenser 9. Condenser 9 is of standard construction and may be cooled by any suitable medium, such as circulating water through the pipes 11 and 12. Any condensate forming in condenser 9 is conducted by means of pipe 13 into the decanter or separator 14.

The valved pipe 16 carries away one layer from the decanter and the valved pipe 17 conducts the other layer back to the column for reflux and reuse therein.

Figs. 2, 3, 4 and 5 show diagrammatically certain characteristics possessed by the separating agents employed in my process. The particular point of interest to be noted from the curves, which it will be kept in mind are not the usual plots of vapor composition versus liquid composition, is that these plots of the separating agents show a crossing of the 45° diagonal. This demonstrates the fact that these hydrocarbons form constant boiling mixtures with acetic acid. The several agents, cyclohexene, hexane, petroleum fraction and cyclohexane, have been disclosed on the drawing as examples of separating agents which may be used in accordance with my invention and are set forth merely for the purposes of illustration. There are various other agents which may be employed, such as, for example, xylene. The important feature for my separating agent is that it be capable of forming an azeotrope, not only with acetic acid, but with water. In general, satisfactory separating agents will comprise the various hydrocarbons either aliphatic or aromatic having boiling points from about 60–145° C.

If the pyroligneous liquid to be treated contains considerable tar and resin forming components and it is desired to eliminate any tar forming tendency during the further processing, the pyroligneous liquid, may be subjected to drastic pressure heating as already described.

One satisfactory design of apparatus is to use a ball mill as a still for this treatment. The resins formed cover the surfaces of the balls and of the inside of the chamber, and later may be conveniently removed by rotating the mill and allowing the balls to grind off the coating so formed.

This apparatus or other apparatus such as, for example, a still pot may be made to operate under whatever pressure and temperature is desired by throttling a valve on the outlet conduit from the apparatus. The apparatus employed would, of course, be large enough and of sufficiently heavy construction to withstand the pressure and capable, under conditions of the feed employed, to give to the materials under treatment an average time in the treatment zone, long enough to effect condensation and resinification. Vapors could if desired be continuously withdrawn. The resins formed may be commercially utilized if desired.

This material either before or after heat treatment, including oils, tar, acetic acid and water, or material from some other source such as cellulose processing and comprising salts, oils, acetic acid and water may be fed into column 1 through conduit 7.

This column may be in continuous operation, hence previously charged with separating agent at any suitable point such as through conduit 7 or by addition to the decanter. As already indicated this agent may comprise a variety of compounds. In the example under consideration xylene or petroleum fraction are described.

Heat is supplied to column 1 and the acid, water and xylene distill over at temperatures materially below 100° C. even though the component, acid-water, has a boiling point of above 100° C. This yields a clean separation from the tar, salts or the like at much lower temperature than otherwise obtainable. These solids may be removed at 6.

The acid, water and hydrocarbon are condensed in condenser 9, then decanted at 14, and the hydrocarbon may be returned to column 1 for further use. The other layer in the decanter in the example under consideration, includes acetic acid, water and methanol, if no preliminary demethanolization has been applied.

It is clear that if liquid from cellulose manufacture was being treated it might comprise for example, acetic acid, water and low boiling solvent; the low boiling solvent being separated in a manner similar to my separating methanol from pyroligneous.

From the preceding disclosure it will be apparent that my invention may be carried out in many forms of apparatus of which the apparatus described in the accompanying drawing is particularly suitable. It will also be understood that the customary precautions for preventing heating losses by suitable insulation will be observed, and that parts which contact with the acids or corrosive materials are made out of suitable materials such as aluminum, aluminum alloys, copper or copper alloys, iron silicon aloys and various types of stainless steel. The steel known as KA2S is particularly suitable for the construction of all parts which contact corrosive material. Parts subjected to heat will be constructed of heat-resisting materials. When I refer to boiling points and the like I refer to this data as being obtained under normal atmospheric conditions.

I claim:
1. In a process for treating pyroligneous liquid to separate the aqueous acetic acid of the pyroligneous liquid from the tarry components thereof, which comprises subjecting the pyroligneous liquid to a heat treatment for about 1 to 3 hours at a temperature equivalent to a steam pressure of about 100 to about 150 pounds, thereby reducing or eliminating any further tar forming tendency in the pyroligneous liquid, continuously withdrawing the vapors formed during this heat treatment, and subjecting these vapors to further treatment to recover the acetic acid therefrom.

2. In a process for treating pyroligneous liquid to separate the aqueous acetic acid of the pyroligneous liquid from the tarry components thereof, which comprises subjecting the pyroligneous liquid to a heat treatment in an apparatus having surfaces exposed to the liquid for about 1 to 3 hours at a temperature equivalent to a steam pressure of about 100 to about 150 pounds, and in the presence of exposed surfaces upon which any tar formed by the heat treatment may deposit, continuously withdrawing the vapors from the heat treatment, and subjecting the exposed surfaces to mechanical treatment to remove the tar therefrom.

DONALD F. OTHMER.